(12) United States Patent
Cheriton

(10) Patent No.: US 7,027,393 B1
(45) Date of Patent: Apr. 11, 2006

(54) TCP OPTIMIZED SINGLE RATE POLICER

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1124 days.

(21) Appl. No.: 09/798,648

(22) Filed: Mar. 2, 2001

(51) Int. Cl.
H04J 1/16 (2006.01)
H04J 3/14 (2006.01)
H04L 12/26 (2006.01)

(52) U.S. Cl. .................. 370/230.1; 370/232; 370/235.1
(58) Field of Classification Search ................. 370/235, 370/232, 229, 230, 230.1, 231, 233, 234, 370/235.1, 253, 252; 709/224, 225, 232, 709/233, 234, 235; 109/223
See application file for complete search history.

(56) References Cited

U.S. PATENT DOCUMENTS

| | | | | |
|---|---|---|---|---|
| 5,734,825 A | * | 3/1998 | Lauck et al. ................. | 709/233 |
| 6,144,639 A | * | 11/2000 | Zhao et al. .................. | 370/235 |
| 6,147,969 A | * | 11/2000 | Benmohamed et al. ..... | 370/230 |
| 6,324,165 B1 | * | 11/2001 | Fan et al. .................... | 370/232 |
| 6,400,684 B1 | * | 6/2002 | Benmohamed et al. .. | 370/230.1 |
| 2003/0223370 A1 | * | 12/2003 | Jain et al. .................... | 370/235 |
| 2004/0057378 A1 | * | 3/2004 | Gronberg .................... | 370/230 |
| 2004/0170127 A1 | * | 9/2004 | Tanaka ........................ | 370/235 |

* cited by examiner

Primary Examiner—Feben M. Haile
(74) Attorney, Agent, or Firm—Campbell Stephenson Ascolese LLP

(57) ABSTRACT

An extension to the conventional single rate microflow policer that provides dual rate policing with a minimum of extra resource utilization. Using the extended microflow policer, an aggressive TCP flow ramps up to exceed the policer rate, setting a burst drop flag. Once the flow rate exceeds the burst rate, a single packet is dropped and the burst drop flag is cleared. On seeing the single packet drop, the TCP sender is then expected to reduce its rate. Flows that do not back off will eventually exceed a higher, hard drop threshold and experience packet drop. An aggressive TCP rate thus oscillate around the burst rate, efficiently approaching the hard drop rate without exceeding it. The addition of only a single bit flag avoids the cost of a dual-rate policer and the tail drop behavior induced by a single rate policer.

26 Claims, 3 Drawing Sheets

TCP OPTIMIZED SINGLE RATE POLICER

BACKGROUND OF THE INVENTION

1. Field of the Invention

The present invention relates to digital communications systems, in particular computer networking, and specifically data flow rate control.

2. Description of the Related Art

In the field of computer networking, one area of concern is maintaining and supplying a pre-negotiated quality of service (QoS) and/or a guaranteed packet rate. Further discussion of the general quality of service problem can be found in James F. Kurose and Keith W. Ross, *Computer Networking: A Top Down Approach Featuring the Internet* (Addison Wesley 2000), Chapter 6.6, incorporated herein by reference in its entirety.

Many systems attempt to provide a guaranteed bit rate or packet rate for designated flows through a switching or routing system. A "flow" is here defined as a unique data connection between a certain designated source address and a designated destination address. Generally speaking, a "flow" is a defined subset of the packet cell traffic between designated endpoints, not merely a transport connection.

Policers are a critical component in providing quality of service in data networks. Policers are used to hold a packet flow to a target rate in the presence of burst traffic. Token bucket and leaky bucket mechanisms are well known approaches to policing packet streams. See, for example, Kurose and Ross, cited above. In addition, there are "virtual time" based approaches to policing such as that described in the ATM Forum Traffic Management Specification, (version 4.0, af-tm-0056.000, June 1996) as the theoretical arrival time (TAT) algorithm. The ATM Forum Traffic Management Specification is incorporated herein by reference in its entirety. However all of these approaches have the same drawbacks seen in packet buffering, namely tail dropping. Tail dropping, as that term is understood in the art, refers to the complete drop of all packets in a transmission burst after the bursting flow exceeds its designated maximum flow rate.

The problem of tail dropping in packet buffers is described in S. Floyd, and V. Jacobson, *Random Early Detection Gateways for Congestion Avoidance*, IEEE/ACM Transaction on Networking, vol. 1, No. 4, August 1993, p. 397–413 and in V. Jacobson, K. Nichols, and K. Podhuri, *RED in a Different Light*, Technical Report, April 1999. Both of these papers are incorporated herein by reference in their entireties.

Generally speaking, bandwidth management on the links between routers and switches is the key element in maintaining quality of service. As noted in Kurose and Ross, there are three aspects of a flow's packet rate among which one could choose to implement a policing scheme. These three important policing criteria, which differ from each other according to the time scale over which the packet flow is policed, are as follows:

Average Rate. The network may wish to limit the long term average rate (i.e., packets per time interval) at which a flow's packets can be sent into the network. A crucial issue here is the interval of time over which the average rate will be policed. For example, a flow whose average rate is limited to 100 packets per second is more constrained than a flow that is limited to 6,000 packets per minute, even though both have the same average rate over a long enough interval of time. The latter constraint would allow a flow to send 1000 packets in a given second-long interval of time (subject to the constraint that the rate be less than 6,000 packets in a minute), while the former constraint would disallow this sending behavior entirely.

Peak Rate. While the average rate constraint limits the amount of traffic that can be sent into the network over a relatively long period of time, a peak rate constraint limits the maximum number of packets that can be sent over a shorter period of time. Using the example above, the network may police a flow at an average rate of 6,000 packets per minute, while limiting the flow's peak rate to 1,500 packets per second.

Burst Size. The network may also wish to limit the maximum number of packets (i.e., the burst packets) that can be sent into the network in an extremely short interval of time. As this interval length approaches zero, the burst size limits the number of packets that can be instantaneously sent into the network. While it is physically impossible to instantaneously send multiple packets (after all, every link has a physical transmission rate that cannot be exceeded), the abstraction of a maximum burst size is a useful one.

One model that can be used to characterize different policing schemes is known as the "leaky bucket" mechanism (sometimes called the leaky bucket algorithm). A leaky bucket consists of a bucket (a logical container) that can hold up to b tokens.

In the leaky bucket mechanism, tokens are added to the bucket as follows: new tokens (which may potentially be added) are always generated at a rate of r tokens per second. If the bucket is filled with less than b tokens when a token is generated, the newly generated token is added to the bucket. Otherwise, the newly generated token is ignored and the token bucket remains full to its capacity of b tokens. The "leak" arises from the fact that tokens are removed from the bucket according to a defined rule representing the act by which the parameter policed (here, packet transmission).

The leaky bucket mechanism can be used to police a packet flow in the following manner: suppose that before a packet is transmitted into the network it must first remove a token from the token bucket. If the token bucket is empty, the packet must wait for a token. In this way, packets cannot enter the network until a token is available for them. This is analogous to requiring a ticket to enter a freeway.

Alternatively, rather than waiting for a token, a packet that arrives at an output queue looking for a token could be dropped if there are insufficient tokens to allow it to be enqueued. This is an example of a leaky bucket mechanism employed as an output queue control device.

The virtual time policing scheme, also well-known in the art, can also be used, as virtual time policers are generally considered an alternate to leaky bucket algorithms. In the virtual time scheme, the process first determines the "next time" that a flow is allowed to send a packet. When the next packet in that flow arrives, its time of arrival is compared to the "next time." If the packet has arrived earlier than the "next time," it needs to be policed or perhaps dropped. If the packet arrived later than the "next time," it is allowed. A burst parameter is usually associated with each policer to indicate how much earlier than the "next time" a packet can arrive before it is policed.

The question now becomes, "How does the network behave in response to packet that is either dropped or held (i.e., buffered)?" Adaptive flows, such as TCP, typically respond to a lack of packet transmission, designated by the failure to receive a return acknowledgement from the receiving (destination) system, by reducing their transmit rate. In this way, an adaptive flow (often called a well-behaved flow) can slowly reduce its rate in response to unsuccessful transmissions.

In the presence of a packet transmission burst from a given flow, a leaky bucket mechanism will be able to pass at most b packets simply because the maximum size of the leaky bucket is b packets. Furthermore, because the token generation rate is r, the maximum number of packets that can enter the network in any interval of time length t is rt+b. Thus, the token generation rate r serves to limit the long term average rate at which packets can enter the network by causing the well-behaved, adaptive flows to lower their average, aggregated transmit (sending) rate to r.

One problem seen in the art and especially vexatious in situations requiring fine-grained, per-flow policing (also known as microflow policing) is that a TCP flow will ramp up to the policer rate and then experience a hard drop. In other words, in accordance with standard behavior of TCP flows, the sender will continue to increase its transmission rate until it fails to transmit a packet successfully. At this point, again according to the TCP standard, the packet drop (as indicated by the receipt of a double acknowledgment message at the sender) will cause the TCP sender to re-send the first unacknowledged packet and adjust its transmit rate downwards. If there is just one packet dropped, the flow will recover and continue at the reduced rate. However, if several packets have been dropped, the TCP connection will receive further duplicate acknowledgements. At that point, the sender will resort to a retransmission timeout.

A retransmission timeout, also by definition, causes the TCP sender to reset its transmission rate to the lowest supported rate on the link. The net result is that the TCP transmission rate will drop far below the policing rate on the occurrence of the first set of multiple packet drops and will remain at a sub-policing rate for a relatively long period of time. The situation is illustrated in FIG. 1A wherein the sawtooth behavior of the transmit rates results from the re-transmission timeout response to packet drops.

Some solutions for this problem, and the resulting loss in transmission efficiency, use two levels of policing, one of which only causes a mark or an upstream message that congestion is occurring. The second level, set at a slightly higher rate, causes a hard packet drop. The idea behind this approach is that the mark message will cause adaptive flows to reduce their rate by a small increment rather than starting all over at the minimum TCP rate and ramping up. In systems using this approach, a burst transmission momentarily supplying a rate in excess of the mark rate results in a slight decrease in transmitter rate, rather than a hard drop.

The disadvantage of this scheme is that it is difficult to implement in router and switch hardware. Such a dual-level or dual-rate policing scheme requires a great deal of additional memory and computational resources within the switch because the packet flow rate must be tested against two different rates, rather than one.

What is needed is a system that can provide fine-grained policing on a per-flow basis and is relatively immune to re-transmission timeout and concomitant loss transmission efficiency. Such a system must operate without consuming too much of the scarce processor and memory resources available in modern network devices.

SUMMARY

The present invention provides an extension to the conventional single rate microflow policer that provides the essential functionality of dual rate policing for TCP flows with a minimum of extra resource utilization. Using this extended microflow policer, an aggressive TCP flow will ramp up to exceed the policer rate, setting a burst drop flag. Once the flow crosses into the burst area, i.e., the flow rate exceeds the burst rate, a single packet will be dropped, in one embodiment of the present invention, and the burst drop flag will be cleared. On seeing the single packet drop, the TCP sender is then expected to back off, i.e., reduce its rate before going over the higher hard drop threshold. A TCP flow will thus oscillate in rate, approaching the hard drop rate without exceeding it.

In an alternate embodiment, a switching device employing the present extended microflow policer system may also include a burst drop enable flag (provided on a per port, per switch, or per flow basis) to turn on or off the extended dual-rate policing feature. With this flag cleared, the particular policer effected behaves like a conventional single threshold policer.

The extended microflow policer presently disclosed is implemented by providing a single bit extension to the state variable representing each microflow. This extension is over and above the state variable traditionally used in conventional per-flow policing schemes. The addition of only a single bit provides an efficient and cost-effective method of providing microflow policing of TCP flows without the cost of a full scale, dual-rate policer and without the tail drop behavior induced by a conventional single rate policer.

In a further alternate embodiment, this extended microflow policer technique can be employed with flows of any well-behaved and adaptive protocol and is thus not limited to use with TCP flows. This is so because adaptive flows, by definition, reduce their rates in response to a single drop without going into a re-transmission timeout period and without resetting rates all the way to a low and inefficient minimum value before ramping up again.

BRIEF DESCRIPTION OF THE DRAWINGS

The present disclosure may be better understood and its numerous features advantages made apparent to those skilled in the art by referencing the accompanying drawings.

The use of the same reference symbols in different drawings indicates similar or identical items.

DETAILED DESCRIPTION

In a packet processing system such as that found in a modern router or switch, quality of service (QoS) decisions need to be made after the access control list (ACL) or policy routing decisions are made. Part of the QoS decision is insuring the guaranteed rate (i.e., the rate contracted for by the sender) is provided on the designated network connection. In such a system, the element that provides rate guarantee is designated a rate-policing module (RPM).

Figure 2:
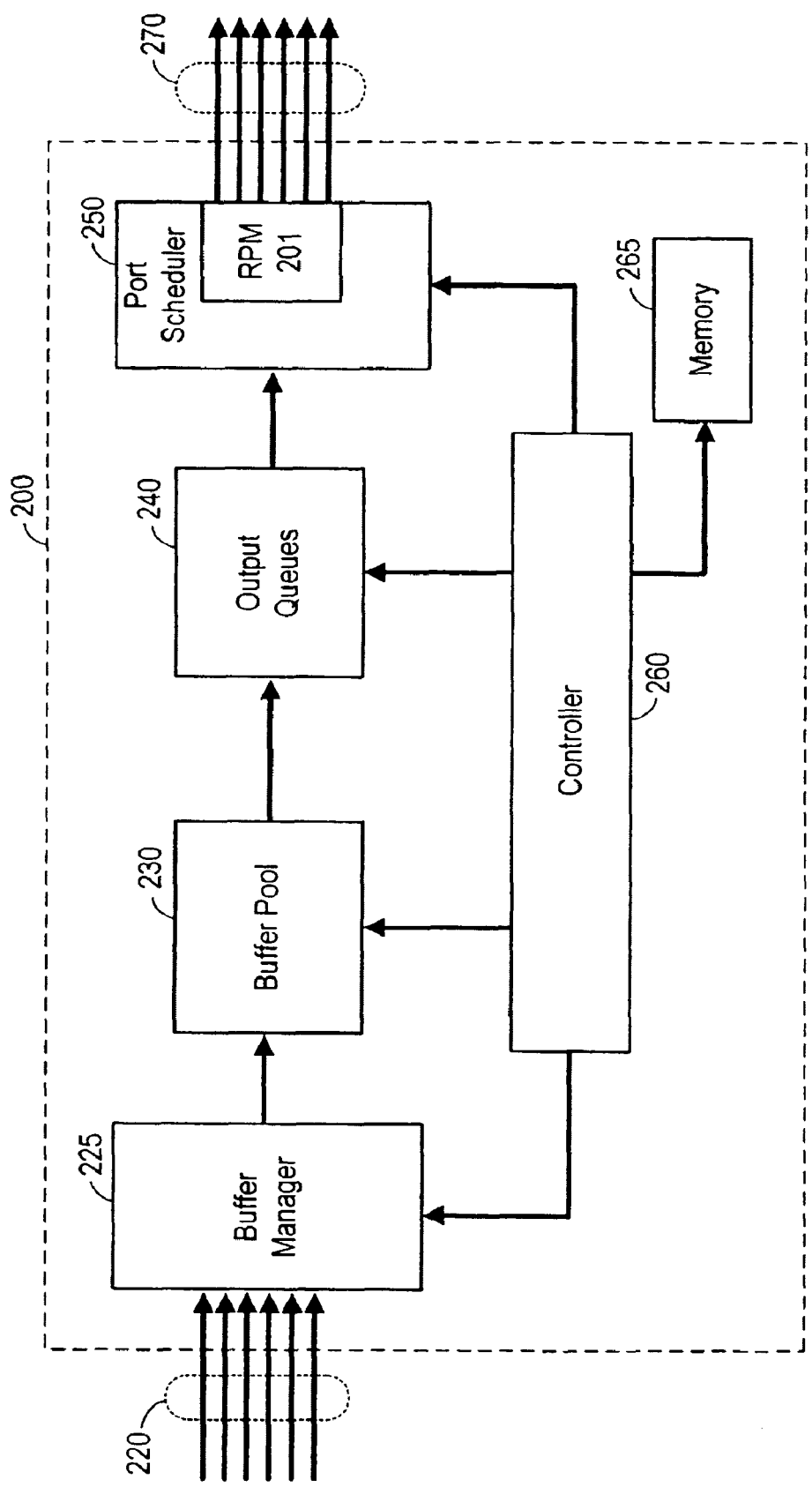
FIG. 2 is a high level schematic diagram of a generic switch/router system showing a policer module according to one embodiment of the present invention.

FIG. 2 shows a high level block diagram of a generalized switch/router 200 used in data communications. Rate policing module 201 is the element that reads a predetermined policing parameter (of which more later) and tests the corresponding designated flow against that parameter. In other words, a packet flow defined by some combination of packet parameters including (but not limited to) packet type, input and/or output ports, input and/or output classification (e.g., type of service), source address, destination address, is tested against a particular parameter to determine whether or not the rate demanded by that flow meets or exceeds the policing limitation.

Note that the term "policer" is also used to refer to an entry in a policer table. This entry comprises a value representing one or more aspects of how the data rate is to be guaranteed for a particular microflow.

The policing module works both on the input packet flow (i.e., before the forwarding decision) and on the output flow (i.e., after the forwarding decision) within the overall packet processing device. Thus, a policer can apply quality of service rate control rules based on either input information (such as the source address) or output information (such as the destination address for the next hop). The decision between how and where to apply the policing is a function of the overall flow itself and is therefore controlled by configuration (i.e., programming) of the switch/router.

The overall function of the rate policing module is to prevent a transmitting host from sending more than a certain number of bits per second through a link. Thus, the policer is (generally speaking) a rate limiter.

Rate limiting is required on TCP flows because TCP begins operation by sending at a slow rate (also known as slow start) and ramps up the transmission rate until the sender discovers a packet drop. This approach allows the TCP flow sender to determine how fast data can be sent through a particular data transmission path.

TCP is designed so that when the flow reaches its rate limit, packets will be dropped. Packet drop is, as discussed previously, signaled by detecting a double acknowledgment message (ACK) from the sender. Detection of the double acknowledgment has an inherent latency because of the time lag between when the source sends the packet and when it receives the second ACK. This latency is affected by the roundtrip time (RTT) between the source and the destination points.

Figure 1A:
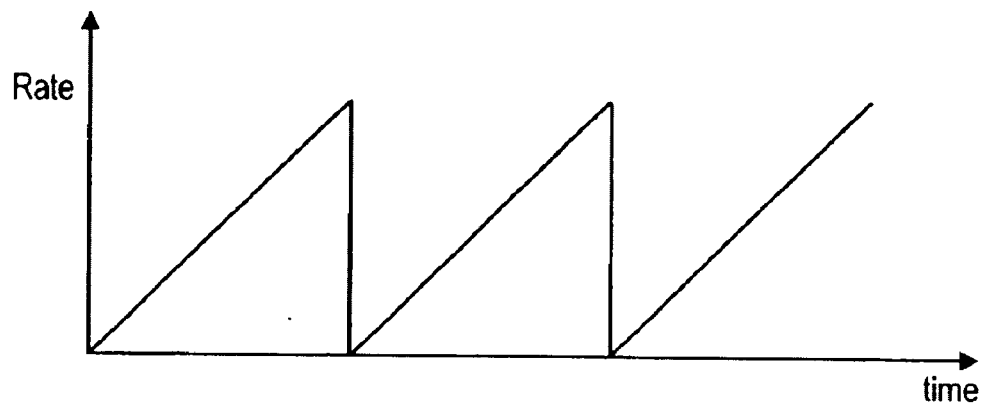
FIG. 1A is an illustration of the sawtooth rate behavior over time in prior art TCP flow policers.

A problem arises in this architecture because a single rate policer drops all packets once the rate has been exceeded: the single-rate policer effectively reduces the link rate to zero immediately upon detecting a burst exceeding the designated maximum link rate. To the source, this zero rate (i.e., 100% packet drop) does not necessarily imply congestion; it can also signal a link failure. Because of this, the TCP protocol is designed to slow start transmission all over again from a near-zero rate and slowly ramping up. As shown in FIG. 1A, this results in an rate profile that starts near zero, ramps up to a maximum rate, and then immediately drops to zero once again. In terms of system performance, this behavior increases the amount of time in which the system is transmitting at less than full rate. As one can see from inspection of FIG. 1A, the system is transmitting at much less than its maximum rate for most of the time.

The problem goes deeper than a lack of efficiency in transmission rate. Because policers do not provide (by definition) any buffering whatsoever, all packets that are dropped because they exceed the designated maximum rate are in fact lost and must be re-transmitted. The overall delay in transmission increases drastically for packets that are dropped, making such a link completely unacceptable for time critical packet transmissions. Re-transmission also has the undesirable side effects of increasing network loading and overall packet latency.

A dual-rate policer addresses both of these problems by maintaining two rates at which it takes action. The first rate, designated $R_1$ for the burst threshold, is the rate where a first packet is either marked or dropped to signal to the transmitting source that the police rate has been exceeded. This signaling results in the source slowing down or reducing its transmission rate. Above the second rate, $R_2$ (also known as the hard drop rate), the flow will suffer 100% packet drop. $R_2$ exceeds $R_1$ by an amount selected by the system operator based on system capacity, loading, desired or guaranteed flow rate, and/or other factors commonly used in network tuning by those of ordinary skill in the art. In one embodiment of the present invention, $R_2=2*R_1$.

For example, if the target rate for a flow is 25 Mbps, the $R_1$ is set at 25 Mbps and $R_2$ could be set to 50 Mbps. $R_1$ is set to 25 Mbps so that the flow experiences one drop (or some congestion signal) when it hits the desired maximum rate. In a conventional TCP implementation, the rate can at most double on each round of rate increases, during at most one round-trip time. Thus, a flow going at 25 Mbps will reach at most 50 Mbps before it detects the single packet drop and then can react by reducing its rate. Thus, a well-behaved TCP implementation will oscillate in rate from above 25 Mbps to below 25 Mbps based on these packet drops, achieving the desired behavior. A misbehaving TCP flow might not respond to the packet drop, continuing to increase its rate all the way up to 50 Mbps, but at least it is strictly limited to at most this data rate.

In earlier systems that attempted to implement dual-rate policing, the hardware implementation costs were exceedingly high. In fact, prototyping and experimentation determined that dual-rate implementation costs were at least double that of the single-rate policer. This follows logically because whatever mechanism is necessary to keep track of system behavior and to mark or drop packets exceeding a given rate must be implemented for both $R_1$ and $R_2$.

The cost of implementation is determined at least in part by the requirement to maintain state for each flow. That is, if the switch is expected to have 128K discrete flows, that switch must have storage space for 128K discrete state vectors. In a dual rate scheme, a second state vector is needed for each flow. Regardless of whether or not the state vector space is hashed, twice as many state vectors are required per flow in a dual-rate policing scheme.

The solution to this problem is found by noting that real TCP flows occurring in operational networks today never present a smoothly changing rate. In practice, the linear sawtooth rate ramp of FIG. 1A is rarely seen. The rate of any real world TCP flow always varies over a given time period and usually takes the form of a very rough sawtooth. This is so because the destination system (the ultimate receiving host in the network) will always have an upper limit in the amount of data it can receive. TCP, by design, always increases its rate as far as it can in order to try and capture as much link bandwidth as possible and therefore provide the most efficient link transmission.

In one embodiment of the present invention, when the received flow is a TCP flow and its rate first exceeds first threshold $R_1$ (i.e., on receipt of the first packet whose bytes per time period exceeds $R_1$ but does not exceed $R_2$), the system will drop that first packet and remember that it has dropped it. More specifically, upon receipt of the first packet at a rate greater than $R_1$, the system sets a flag called tcpBurstDrop to prevent another drop. The presence of a set (value equals one) tcpBurstDrop flag indicates that the system has already received a burst packet. Because decisions are made based on a measured rate, this embodiment necessarily uses a virtual time approach or similar method for rate sensing. The virtual time approach, and its many variations, are well-known to those of ordinary skill in the art.

The following pseudocode description illustrates one embodiment of a virtual time policing algorithm operating in accordance with the present invention. This sample algorithm is run on each packet arrival. Note that a packet is not charged to (i.e., acted upon by) a policer if it has already been dropped by a (logically) earlier processing step.

While this form of algorithm description (i.e., pseudocode) is well-known to those of skill in the art, it is worth noting that pseudocode is only a high-level representation of what actual software algorithms or hardware systems would necessarily implement.

```
// currentTime refers to wall clock, i.e. global system time
if ((policer.nextTime-currentTime)>policer.burstTime) {
    police( );
    policer.overRateBytes += pktLength;
}
else {
    if (policer.nextTime < currentTime)
        policer.nextTime = currentTime;
    policer.nextTime += pktLength * policer.share;
    policer.underRateBytes += pktLength;
}
```

In order to police at the microflow level, the above pseudocode sample must be adapted to operate on individual microflows. The following code example shows on variation of such an adaptation. One of ordinary skill in the art will readily see that other variations are possible. Accordingly, the present disclosure should not be read as limited to a single pseudocode example.

```
// mflow policing.
pod.mflowPolOver = 0;
mflowPolSingleTcpDrop = 0;
if( ( newFdtle.nextTime - currentTime ) > newFdtle.burstTime
) {
    pod.mflowPolOver = 1; // hard drop
}
else if( mflowPolCtrlReg.tcpBurstEn[pod.maskSel] &&
    f2nr.flowLabelType == Ipv4 &&
    f2nr.flowLabel.ipProtocol == TCP ) {
        if( ( newFdtle.nextTime - currentTime ) >
            newFdtle.burstTime/2 ) {
            // Do single packet drop & set flag
            if( !newFdtle.tcpBurstDrop ) {
                newFdtle.tcpBurstDrop = 1;
                mflowPolSingleTcpDrop = 1;
            }
        }
}
```

The tcpBurstDrop flag is reset later if the rate is then below that called for by the policer, as handled by the next pseudocode sample below. Here, mflowPolOver indicates if we are over the policer rate, and inQoSPermit indicates whether the packet has been permitted (or not dropped) by previous processing. The newFdtle variable designates a microflow policer (actually a whole microflow entry).

```
if( !mflowPolOver && inpQosPermit ) {
    // we can charge the packet to the mflow policer
    if( newFdtle.nextTime < currentTime ) {
        newFdtle.nextTime = currentTime;
        newFdtle.tcpBurstDrop = 0;
    }
    newFdtle.nextTime += pktLength * newFdtle.share;
}
```

By adding the single bit tcpBurstDrop flag to the flow state vector, the system effectively provides a second policing rate level. This is so because the act of dropping a single packet at a burst level and then continuing to transmit packets at or even above the burst level (though less than hard drop level $R_2$) enables the link to absorb burst packets. Absorption continues at a rate greater than $R_1$ for a long enough period of time for the double ACK from the single dropped packet to reach the sender and thereby cause it to throttle back (reduce) its rate.

Figure 1B:
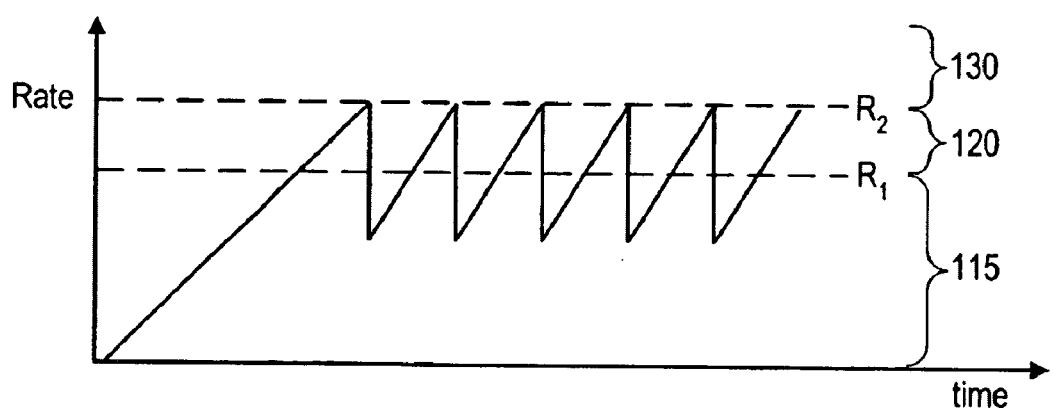
FIG. 1B illustrates the approximate rate behavior over time in one embodiment of the present invention.

The net effect of this mechanism is shown in FIG. 1B which represents a "sawtooth on a sawtooth" rate history over time. In region 115, we see the slow start of the standard TCP packet flow. At threshold $R_1$, we see the rate crossing into the burst region 120. At threshold $R_2$, the hard drop limit, we see the packet rate dropping back down. However, hard drop region 130 does not necessarily begin exactly at rate $R_2$; in reality, it occurs as soon as the transmitting source realizes it needs to send at a lower rate. The rate drops straight down and then recovers somewhere below rate $R_1$ and begins to ramp up again in region 120. It is this sawtooth behavior in region 120 that maintains the rate through the link at a relatively high efficiency compared to the strong sawtooth behavior shown in FIG. 1A.

FIG. 2 shows a high-level block diagram of a network switching or routing device 200 providing the dual-rate policer system according to one embodiment of the present invention. A number of input flows 220 are presented to the unit. These flows each consist of multiple packets of data in a variety of sizes and presented at a variety of rates. Additionally, flows may be presented in different protocols, such as the Transmission Control Protocol/Internet Protocol (TCP/IP) and the related User Datagram Protocol (UDP), File Transfer Protocol (FTP), Terminal Emulation Protocol (Telnet), and Hypertext Transfer Protocol (HTTP). Other internetworking protocols are found in the literature, such as Merilee Ford, et. al., *Internetworking Technologies Handbook*, Cisco Press 1997 (hereinafter Ford), incorporated herein by reference in its entirety. The packets are buffered in a buffer pool 230, which is typically random access memory (RAM). Buffering is accomplished according to the directives of a controller 260 and a buffer manager 225. The flows are sent to the proper output port 270 by way of a set of output queues 240 and a port scheduler 250, discussed below. Controller 260 is conventionally implemented as one or more high speed microprocessors with associated interface circuitry. Buffer manager 225 and port scheduler 250 can be implemented as part of a switch ASIC.

Within port scheduler 250 is rate policing module (RPM) 201, according to one embodiment of the present invention. RPM 201 provides the dual-rate policing functionality.

The present invention may be readily implemented on individual flows at any level of granularity. In other words, flows may be defined down to the microflow level representing a single TCP connection in one direction between a designated source and a designated destination address.

Alternatively, the present invention may be implemented in the same way across multiple TCP connections up to and including the aggregate flow level representing all TCP flows from a single source. Microflow granularity is highly desirable in network operations because it enables the finest possible division of QoS levels among flows. This division is important to service providers and customers because it enables providers to provide guarantee different quality of service for different price points to match a wide variety of customer needs.

While the present invention is described in the context of TCP now adaptation, it is equally applicable to any adaptive flow. An adaptive flow here is defined to mean any flow that autonomously adjusts its transmission rate based on its success at delivering data to a destination address. For example, certain video streams such as MPEG-2 automatically adapt to data packet transmission failure by reducing the rate.

Also, while the present invention is described in terms of a hardware implementation, one of ordinary skill in the art would readily see that it is easily implemented in software or a combination of hardware and software. As described above, the overhead problem in prior implementations of dual rate policing becomes extremely onerous in a software implementation because of the huge size and state tables required and the need to manipulate multiple tables in every flow calculation. The present invention is thus advantageous because it expands the state table entry for each flow by only a single bit.

Furthermore, a token bucket scheme can also be used in some embodiments. In a token bucket implementation, the first (single) packet is dropped when the bucket drops below some threshold, such as half full. A single bit flag is then set to remember that a drop has taken place. The hard drop then begins, as normal for a token bucket scheme, when the bucket is empty. As with the virtual time scheme discussed above, the burst drop flag is cleared once the flow resumes normal, non-burst transmission.

In an another alternate embodiment, the present invention can be augmented by the presence of second flag bit, designated the burst drop enable flag. This flag can be set by operator control at the microflow level, i.e., one independent flag bit for each microflow, thus adding only a single bit to the state table entry for that microflow. This burst drop enable flag can then be programmed to activate the burst drop flag feature for a given flow, thus allowing the operator (and the service provider) to offer the dual-rate policing function on a per flow basis. This is advantageous because it enables one more level of customization and control granularity for service providers to offer to their customers.

Process Flow

Figure 3:
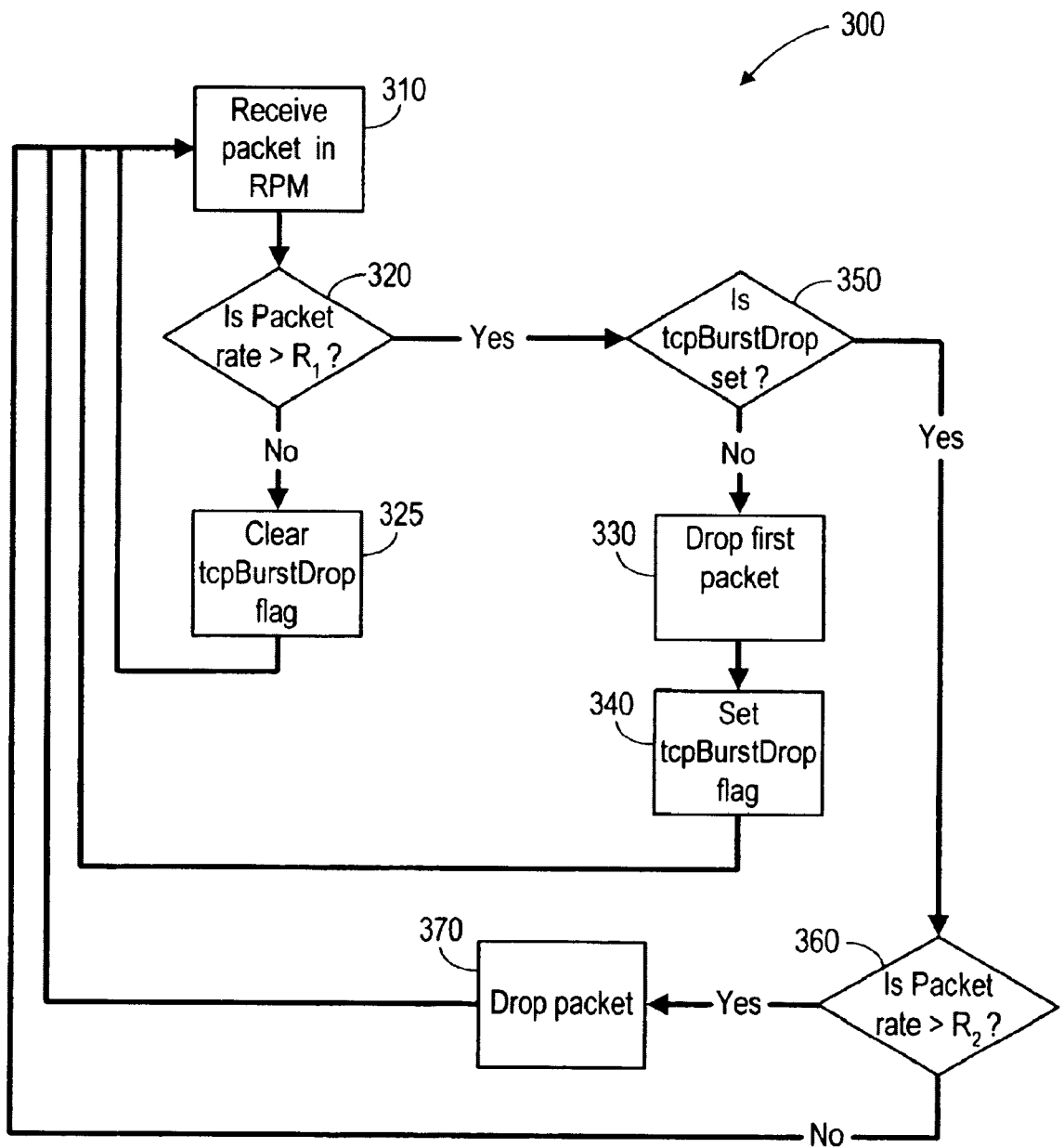
FIG. 3 is a flowchart of the method of one embodiment of present invention.

FIG. 3 shows a high level flow chart of the process by which dual-rate policing is implemented with a single bit extension. Process 300 begins in stage 310, where the packet is received by the rate policer module (RPM). Test 320 determines whether or not the packet rate is above or below threshold $R_1$. If the rate is below rate $R_1$, process 300 proceeds to stage 325 which clears the TCP burst drop flag tcpBurstDrop and passes the packet for further processing (not shown).

Process 300 then returns to stage 310 to receive the next packet. This process continues until a packet exceeding threshold $R_1$ is detected in test 320. Since tcpBurstDrop is initialized cleared, control passes through stage 350 to stage 330. At that point, the first over-rate packet is dropped to signal the source or transmitting host (through the receipt of a duplicate acknowledgement signal) that a traffic burst has been received.

In an alternate embodiment of the present invention, stage 330 does not drop the packet but rather marks it, by means well-known in the art, to signal to the ultimate (downstream) receiving host that it is the first packet in a burst. This signal is provided with the expectation that the receiving host will send an up-channel message to the transmitting host relaying that fact. The transmitting host is expected to reduce the packet flow rate, although the latency (determined at least in part by the round trip time between the transmitting and receiving host) is a factor expected to result in a certain amount of time delay.

Next, in stage 340, tcpBurstDrop is set and the process returns to stage 310 to receive the next packet. At this point, process 300 loops indefinitely through test 320. For example, if the next packet received is below rate threshold $R_1$, whether because the source reduced its rate or because the burst itself was an extremely short duration, process 300 will clear tcpBurstDrop flag in stage 325 and proceed with processing. If, however, the next packet received is also a burst packet, the process flow branches at stage 350, where tcpBurstDrop is tested. If the TCP burst drop flag is set (indicating a case where a burst has already been processed), the new packet will be further tested in stage 360 to see if it exceeds rate $R_2$. If the new packet exceeds rate $R_2$, it will be dropped in stage 370. If not, the new packet will be processed (not shown). Control then returns to stage 310.

The effective rate of a received and policed packet is, in all cases, determined by calculations based on the well-known virtual time technique.

Alternate Embodiments

The order in which the steps of the present method are performed is purely illustrative in nature. In fact, the steps can be performed in any order or in parallel unless otherwise indicated by the present disclosure.

The method of the present invention may be performed in either hardware, software or any combination thereof as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer readable medium (e.g., ROM, RAM, magnetic media, punched tape or card, compact disk (CD) in any form, DVD, etc.). Furthermore, such software may also be in the form of a computer data signal embodied in a carrier wave, such as that found within the well-known web pages transferred among computers connected through the Internet. Accordingly, the present invention is not limited to any particular platform, unless specifically stated otherwise in the present disclosure.

While particular embodiments of the present invention have been shown and described, it will be apparent to those skilled in the art that changes and modification may be made without departing from this invention in its broader aspect and, therefore, the appended claims are to encompass within their scope all such changes and modifications as follows in the true spirit of this invention.

I claim:

1. A method of packet flow rate policing, comprising:
    a) clearing a first flag;
    b) detecting a flow rate of a packet;
    c) comparing said flow rate to a first threshold; and
    d) if said flow rate does not exceed said first threshold, clearing said first flag and waiting;
       otherwise:
         testing said first flag; and if said first flag is not set, marking said packet, setting said first flag, and waiting;
   otherwise:
      comparing said flow rate to a second threshold; and
      if said flow rate exceeds said second threshold, dropping said packet and waiting;
      otherwise waiting;
wherein said waiting comprises waiting for receipt of a next packet and repeating steps b), c), and d) thereupon.

2. The method of claim 1, said marking comprising sending a congestion message downstream.

3. The method of claim 1, wherein marking comprising dropping said packet.

4. The method of claim 1, wherein said detecting comprises a virtual time approximation of the flow rate of said packet.

5. The method of claim 1, wherein said detecting comprises a token bucket approximation of the flow rate of said packet.

6. A method of packet flow rate policing, comprising:
   a) detecting a flow rate of a packet; and
   b) if an enable flag is not set:
      comparing said flow rate to a first threshold;
      if said flow rate exceeds said first threshold, marking said packet; and waiting;
   otherwise:
      clearing a first flag;
      comparing said flow rate to a second threshold; and
      if said flow rate does not exceed said second threshold, clearing said first flag and waiting;
      otherwise:
         testing said first flag; and
         if said first flag is not set, marking said packet, setting said first flag, and waiting;
         otherwise:
            comparing said flow rate to a third threshold; and
            if said flow rate exceeds said third threshold, dropping said packet and waiting;
            otherwise waiting;
wherein said waiting comprises waiting for receipt of a next packet and repeating steps a) and b) thereupon.

7. The method of claim 6, said marking comprising sending a congestion message downstream.

8. The method of claim 6, wherein marking comprising dropping said packet.

9. The method of claim 6, wherein said detecting comprises a virtual time approximation of the flow rate of said packet.

10. The method of claim 6, wherein said detecting comprises a token bucket approximation of the flow rate of said packet.

11. A computer system for packet flow rate policing, comprising a network interface and a processor, wherein the processor comprises computer instructions for:
   a) clearing a first flag;
   b) detecting a flow rate of a packet received from said network interface;
   c) comparing said flow rate to a first threshold; and
   d) if said flow rate does not exceed said first threshold, clearing said first flag and waiting;
   otherwise:
      testing said first flag; and
      if said first flag is not set, marking said packet, setting said first flag, and waiting;
      otherwise:
         comparing said flow rate to a second threshold; and
         if said flow rate exceeds said second threshold, dropping said packet and waiting;
         otherwise waiting;
wherein said waiting comprises waiting for receipt of a next packet from said network interface and repeating steps b), c), and d) thereupon.

12. The computer system of claim 11, said marking comprising sending a congestion message downstream.

13. The computer system of claim 11, wherein marking comprising dropping said packet.

14. The computer system of claim 11, wherein said detecting comprises a virtual time approximation of the flow rate of said packet.

15. The computer system of claim 11, wherein said detecting comprises a token bucket approximation of the flow rate of said packet.

16. A computer-readable storage medium, comprising computer instructions for:
   a) clearing a first flag;
   b) detecting a flow rate of a packet;
   c) comparing said flow rate to a first threshold; and
   d) if said flow rate does not exceed said first threshold, clearing said first flag and waiting;
   otherwise:
      testing said first flag; and
      if said first flag is not set, marking said packet, setting said first flag, and waiting;
      otherwise:
         comparing said flow rate to a second threshold; and
         if said flow rate exceeds said second threshold, dropping said packet and waiting;
         otherwise waiting;
wherein said waiting comprises waiting for receipt of a next packet and repeating steps b), c), and d) thereupon.

17. The computer-readable storage medium of claim 16, said marking comprising sending a congestion message downstream.

18. The computer-readable storage medium of claim 16, wherein marking comprising dropping said packet.

19. The computer-readable storage medium of claim 16, wherein said detecting comprises a virtual time approximation of the flow rate of said packet.

20. The computer-readable storage medium of claim 16, wherein said detecting comprises a token bucket approximation of the flow rate of said packet.

21. A computer data signal embodied in a carrier wave, comprising computer instructions for:
   a) clearing a first flag;
   b) detecting a flow rate of a packet;
   c) comparing said flow rate to a first threshold; and
   d) if said flow rate does not exceed said first threshold, clearing said first flag and waiting;
   otherwise:
      testing said first flag; and
      if said first flag is not set, marking said packet, setting said first flag, and waiting;
      otherwise:
         comparing said flow rate to a second threshold; and
         if said flow rate exceeds said second threshold, dropping said packet and waiting;
         otherwise waiting;
wherein said waiting comprises waiting for receipt of a next packet and repeating steps b), c), and d) thereupon.

22. The computer data signal of claim 21, said marking comprising sending a congestion message downstream.

23. The computer data signal of claim 21, wherein marking comprising dropping said packet.

24. The computer data signal of claim 21, wherein said detecting comprises a virtual time approximation of the flow rate of said packet.

25. The computer data signal of claim 21, wherein said detecting comprises a token bucket approximation of the flow rate of said packet.

26. A computer system for packet flow rate policing, comprising a network interface and a processor, wherein the processor comprises means for:
 a) clearing a first flag;
 b) detecting a flow rate of a packet received from said network interface;
 c) comparing said flow rate to a first threshold; and
 d) if said flow rate does not exceed said first threshold, clearing said first flag and waiting;
  otherwise:
   testing said first flag; and
   if said first flag is not set, marking said packet, setting said first flag, and waiting;
  otherwise:
   comparing said flow rate to a second threshold; and
   if said flow rate exceeds said second threshold, dropping said packet and waiting;
   otherwise waiting;
wherein said waiting comprises waiting for receipt of a next packet from said network interface and repeating steps b), c), and d) thereupon.

* * * * *